Sept. 29, 1959  J. SHIRK  2,906,049
HOOK SETTER FOR FISHING TACKLE
Filed Oct. 21, 1957
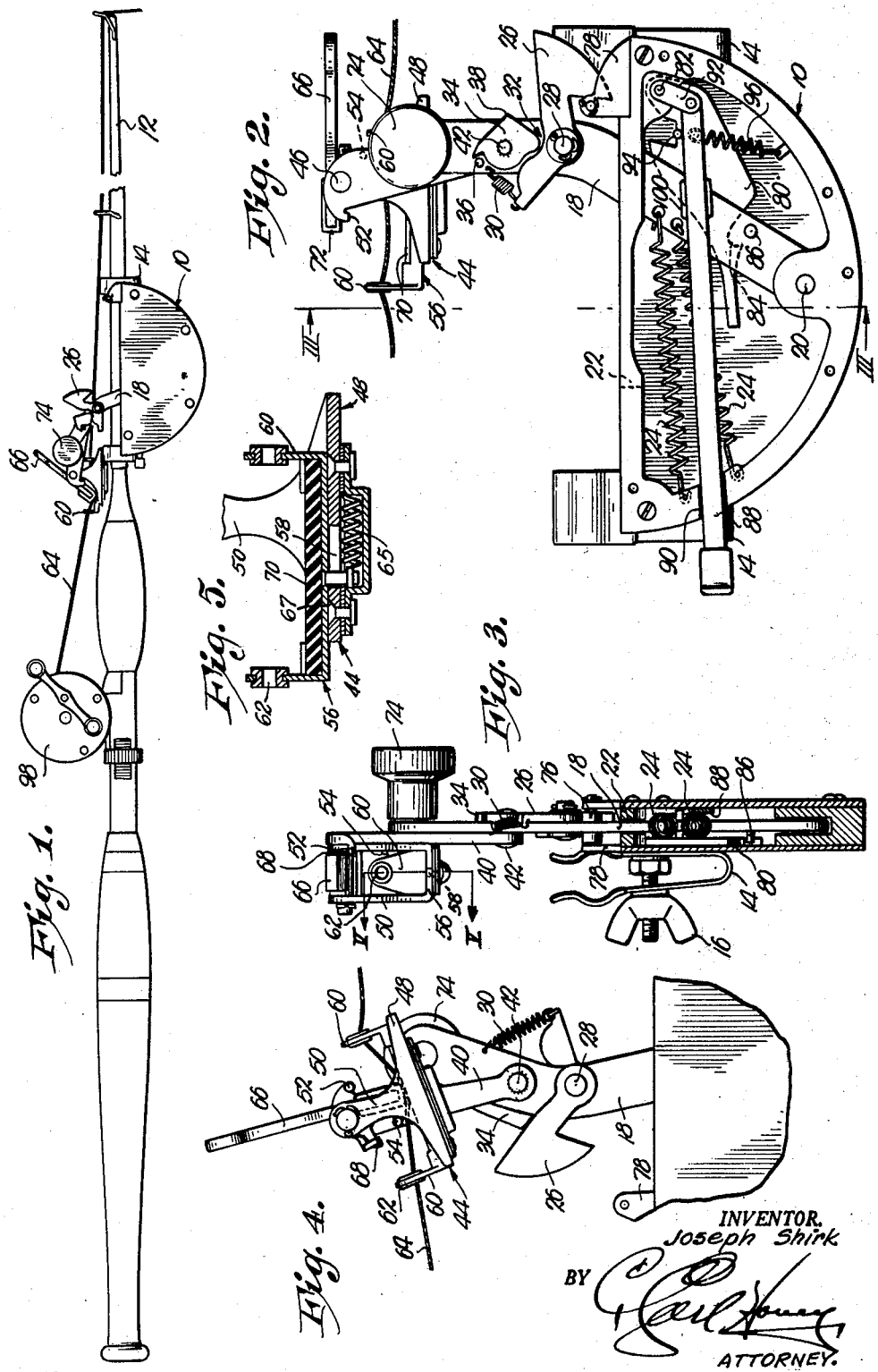
INVENTOR.
Joseph Shirk
BY
ATTORNEY.

United States Patent Office 2,906,049
Patented Sept. 29, 1959

2,906,049
HOOK SETTER FOR FISHING TACKLE
Joseph Shirk, Winfield, Kans.
Application October 21 1957, Serial No. 691,325
8 Claims. (Cl. 43—15)

This invention relates to improvements in fishing equipment and more particularly, to an attachment for a fishing pole or the like adapted for use in connection with the fishing line to set the hook in the mouth of the fish automatically as soon as the fish strikes and imparts a tug on the line.

It is the most important object of the present invention to provide a hook setter that not only jerks the line when the device is tripped by the action of the fish, but which device permits the fisherman to reel the line in because of an automatic release of the line with respect to the hook setter itself when the reel is manually actuated in the usual manner.

Another object of the instant invention is to provide a hook setter that incorporates a swingable, spring-loaded arm and which arm in turn is provided with a swingable lever, the latter of which releases a lock in response to a tug on the line by the fish to the end that the arm jerks the line in response to the action of the spring therefor.

A still further object of the instant invention is to provide novel gripping means for the line having as a part thereof, a pair of shiftable elements capable of tightly clamping the line therebetween when the elements move in one direction, but which elements automatically release the line when the latter is reeled in.

Still further, it is an important object of the present invention to incorporate in the hook setter a novel safety device which may be manually released after the attachment is mounted on the pole and the line threaded through the gripping device forming a part of the hook setter.

Other objects include important details of construction to be made clear as the following specification progresses.

In the drawing:

Fig. 1 is an elevational view of a hook setter for fishing tackle made pursuant to my present invention showing the same operably mounted on a fishing rod.

Fig. 2 is an enlarged view of the hook setter itself removed from the rod with the cover plate of the case entirely removed.

Fig. 3 is a cross-sectional view taken on line III—III of Fig. 2.

Fig. 4 is a fragmentary, elevational view still further enlarged showing the opposite side of the hook setter with the swinging arm structure in the safety position; and Fig. 5 is a fragmentary, detailed, cross-sectional view taken on line V—V of Fig. 3.

A case broadly designated by the numeral 10 mounts all of the components of the hook setter illustrated in the drawing, and is releasably attached to a fishing rod 12 in the manner illustrated by Fig. 1 through the medium of a pair of clips 14 attached to the case 10 and adapted for clamping to rod 12 through manipulation of wing nuts 16.

An elongated arm 18 vertically swingable within case 10 by virtue of pivot 20, extends upwardly through a longitudinal slot 22 within the upper edge of case 10. A pair of springs 24 within case 10 connects the latter with the arm 18 to yieldably bias the arm to one end of its path of travel as shown in Fig. 1 of the drawing.

A bifurcated lock 26 embracing arm 18 intermediate the ends of the latter is swingably mounted on arm 18 through the medium of pin 28 and is yieldably held biased in a downward direction by a spring 30 connecting one end of lock 26 with arm 18.

Lock 26 has a recess 32 in its uppermost edge that receives a swingable cam 34 whose extent of swinging movement is limited in one direction by a stop 36 on arm 18. Corner 38 of cam 34 strikes the upper edge of lock 26 to limit the extent of swinging movement of cam 34 in the opposite direction.

Arm 18 carries a lever 40 on that face thereof opposite to cam 34, through the medium of a pintle 42 which also serves to swingably mount the cam 34 on the arm 18, pintle 42 being rigid to, and rotatable with, both the lever 40 and the cam 34.

A gripping device broadly designated by the numeral 44 is swingably mounted on the lever 40 adjacent the upper end of the latter through the medium of a stud shaft 46. The device 44 includes a U-shaped bracket 48 suspended from the shaft 46 and having its legs 50 swingable on the shaft 46, the extent of swinging movement of the bracket 48 being limited by one of the legs 50 operating between a pair of stops 52 and 54 struck laterally from the lever 40.

The bight of the U-shaped bracket 48 carries a reciprocable, spring-loaded, U-shaped base element 56 that is disposed between the legs 50 of bracket 48, base 56 being guided by a longitudinal slot 58 in the bight of bracket 48 and being connected to the latter by a pin 67. Legs 60 of base 56 are each provided with an eyelet 62 through which fishing line 64 is threaded in a manner that is best apparent in Fig. 4. Base 56 is spring-loaded toward that end of its path of travel shown in Fig. 2, the spring 65 therefor bearing against pin 67 depending from the bight of base element 56 and slidable in slot 58 (see Fig. 5).

The gripping device 44 includes additionally, a manual latch 66 disposed between the legs 50 of bracket 48 and swingable about the shaft 46, a spring 68 between latch 66 and one of the legs 50 yieldably biasing the latch 66 to the position shown in Fig. 2.

The bight of the base element 56 is provided with a lining 70 of resilient material such as hard rubber and the normally lowermost end of the latch 66 is likewise provided with a cap 72 of similar material.

A knob 74 on the arm 18 facilitates swinging of the latter to the position shown in Fig. 4 or the position illustrated by Fig. 2. In the latter position, lock 26 engages a roller 76 carried by an upstanding bracket 78 at the uppermost edge and at one end of the case 10.

A safety catch within the case 10 includes a plate 80 swingable about a pin 82 and provided with a hook 84 adapted to engage a lug 86 on arm 18.

A reciprocable release bar 88 extends through an opening 90 in one end of the case 10 and is swingable about the pin 82 by use of a short link 92 that is pivotally connected with the innermost end of bar 88.

Bar 88 underlies a projection 94 rigid to plate 80 and a spring 96 interconnects case 10 and projection 94.

After the hook setter has been attached to the rod 12 through use of clips 14, the line 64 is threaded through the eyes 62 of the device 44, whereupon the latter may be brought into gripping relationship to the line 64 by manipulation of latch 66. It is obvious that when the latch 66 is swung from the position shown in Fig. 2 toward the reel 98, to the position shown in Fig. 4, cap 72 will move into engagement with that part of the line 64 spanning the distance between eyes 62.

Latch 66 will move the line into engagement with the lining 70 and as the line is gripped or clamped between latch 66 and base element 56, the latter will be shifted by the latch 66 against the action of the spring for the base 56 from the position shown in Fig. 2 to the position illustrated by Fig. 4. Latch 66 will remain in the upright position shown in Fig. 4 by virtue of the resiliency of the materials from which cap 72 and lining 70 are made.

Such threading of the line 64 and clamping of the same in place with respect to the device 44, may take place while the arm 18 is in the safety position shown in Fig. 4. This is accomplished by grasping knob 74 and swinging the arm 18 away from the reel 98 against the action of springs 24 until lug 86 snaps into hook 84. Spring 96 yieldably holds plate 80 in the latched position with respect to lug 86.

Thereupon, after the line 64 has been attached to the device 44, arm 18 may be swung to the position shown in Fig. 2 through use of knob 74. Lock 26 automatically clears the roller 76 by virtue of the springs 30 and engages over the roller 76, holding the arm 18 in the set position. While Fig. 2 illustrates the latch 66 in the released position, it is actually disposed as shown in Fig. 4 when the device is set and awaiting a strike by the fish. It is notable also that, while plate 80 releasably holds the arm 18 against movement to the position shown in Fig. 1 when the safety mechanism is operating, nonetheless, plate 80 does not impede the movement of the arm 18 to the position shown in Fig. 2, even though the operator does not employ the bar 88 to release catch plate 80.

Fig. 2 also shows the plate 80 partially released, but after the lock 26 engages the roller 76, it is but necessary for the operator to pull outwardly on bar 88, swinging the latter, as well as the link 92, about pin 82. This imparts an upward movement to the projection 94 against the action of spring 96, thereby moving the hook 84 out of the path of travel of the lug 86 when arm 18 returns to the position shown in Fig. 1. A pad of resilient material 100 secured to bar 88, bears against the arm 18 and holds the safety mechanism in the released position.

As soon as a fish commences to tug upon the line 64, the device 44 and, therefore, the lever 40 to which it is mounted, is swung clockwise viewing Fig. 2, thereby actuating cam 34 and swinging the lock 26 to the released position against the action of spring 30. Such disengagement of the lock 26 with respect to the roller 76 permits the springs 24 to quickly snap the arm 18 to the position shown in Fig. 2, thereby imparting a jerk on the line 64 and setting the hook in the mouth of the fish.

The operator need not manipulate the latch 66 in order to permit use of the reel 98 since, as soon as the reeling-in operation commences, the pull on line 64 by the reel 98, swings the latch 66 clockwise viewing Fig. 2, whereupon spring 68 returns latch 66 to the position shown in Fig. 2. Thereupon the line 64 will move freely through the eyelets 62 to the reel 98.

Having thus described the invention what is claimed as new and desired to be secured by Letters Patent is:

1. A hook setter comprising a support; an arm swingably mounted on the support; spring means between the arm and the support yieldably biasing the arm to one end of its path of travel; a lock swingably mounted on the arm and engageable with the support when the arm is in a position at the opposite end of its path of travel for releasably holding the arm in said position; a lever swingable on the arm and having a cam swingable therewith and engageable with the lock for swinging the latter to a released position upon swinging the lever to one end of its path of travel; and structure for attaching a fishing line to said lever whereby the latter is swung to release the lock in response to a tug on the line by a fish.

2. A hook setter as set forth in claim 1 wherein is provided a safety catch engageable with the arm intermediate the ends of its path of travel for holding the same against movement under influence of the said spring for said arm; and manual means for releasing the catch.

3. A hook setter as set forth in claim 1 wherein said structure includes a base element and a latch mounted on the lever, the latch being swingable and the base being reciprocable to and from a position clamping the line against the base.

4. A hook setter as set forth in claim 3 wherein is provided a swingable, spring-loaded safety catch engageable with the arm intermediate the ends of its path of travel for holding the same against movement under influence of the said spring for said arm; and a reciprocable bar for swinging the catch against the action of its spring to release the catch.

5. A hook setter comprising a swingable, spring-loaded arm; releasable lock means for holding the arm at one end of its path of travel against the action of the spring therefor; a lever swingable on the arm and having means for releasing the lock upon swinging the lever to one end of its path of travel; and structure for attaching a fishing line to said lever whereby the latter is swung to release the lock in response to a tug on the line by a fish, said structure being swingably mounted on said lever and including a base element and a latch mounted on the lever, the latch being swingable and the base being reciprocable to and from a position clamping the line against the base.

6. A hook setter comprising a swingable, spring-loaded arm; releasable lock means for holding the arm at one end of its path of travel against the action of the spring therefor; a lever swingable on the arm and having means for releasing the lock upon swinging the lever to one end of its path of travel; structure for attaching a fishing line to said lever whereby the latter is swung to release the lock in response to a tug on the line by a fish, there being a safety catch engageable with the arm intermediate the ends of its path of travel for holding the same against movement under influence of the said spring for said arm; and manual means for releasing the catch.

7. A hook setter comprising a swingable, spring-loaded arm; releasable lock means for holding the arm at one end of its path of travel against the action of the spring therefor; a lever swingable on the arm and having means for releasing the lock upon swinging the lever to one end of its path of travel; structure for attaching a fishing line to said lever whereby the latter is swung to release the lock in response to a tug on the line by a fish, there being a swingable, spring-loaded safety catch engageable with the arm intermediate the ends of its path of travel for holding the same against movement under influence of the said spring for said arm; and manual means for swinging the catch against the action of its spring to release the catch.

8. A hook setter comprising a swingable, spring-loaded arm; releasable lock means for holding the arm at one end of its path of travel against the action of the spring therefor; a lever swingable on the arm and having means for releasing the lock upon swinging the lever to one end of its path of travel; structure for attaching a fishing line to said lever whereby the latter is swung to release the lock in response to a tug on the line by a fish, there being a swingable, spring-loaded safety catch engageable with the arm intermediate the ends of its path of travel for holding the same against movement under influence of the said spring for said arm; and a reciprocable bar for swinging the catch against the action of its spring to release the catch.

References Cited in the file of this patent

UNITED STATES PATENTS

| | | |
|---|---|---|
| 481,231 | Johnson | Aug. 23, 1892 |
| 1,840,762 | Akervick | Jan. 12, 1932 |
| 2,707,842 | Humphreys et al. | May 10, 1955 |
| 2,744,351 | Smith | May 8, 1956 |
| 2,766,500 | Chanko | Oct. 16, 1956 |
| 2,791,858 | Kernodle | May 14, 1957 |

FOREIGN PATENTS

| | | |
|---|---|---|
| 697,684 | France | Nov. 4, 1930 |